(12) United States Patent
Kitaoka

(10) Patent No.: US 9,278,482 B2
(45) Date of Patent: Mar. 8, 2016

(54) METHOD AND APPARATUS FOR FABRICATING THREE-DIMENSIONAL OBJECT

(71) Applicant: Satoshi Kitaoka, Kanagawa (JP)

(72) Inventor: Satoshi Kitaoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/273,795

(22) Filed: May 9, 2014

(65) Prior Publication Data
US 2014/0339192 A1    Nov. 20, 2014

(30) Foreign Application Priority Data
May 14, 2013    (JP) .................................. 2013-102361

(51) Int. Cl.
*C23F 1/00*        (2006.01)
*B29C 67/00*       (2006.01)

(52) U.S. Cl.
CPC ......... *B29C 67/0074* (2013.01); *B29C 67/0051* (2013.01); *B29C 67/0085* (2013.01)

(58) Field of Classification Search
CPC ............ B29C 67/0074; B29C 67/0085; B29C 67/0092; B29C 67/20; B29C 67/0051; B29C 67/006
USPC ................................ 216/8, 11, 26, 39, 40, 41
See application file for complete search history.

(56) References Cited

U.S. PATENT DOCUMENTS

| | | | | |
|---|---|---|---|---|
| 4,808,360 A | * | 2/1989 | Natori et al. | ............... 264/221 |
| 4,871,497 A | * | 10/1989 | Natori et al. | ............... 264/86 |
| 5,273,698 A | * | 12/1993 | Thary | ............... 264/46.4 |
| 7,201,625 B2 | * | 4/2007 | Yeh | ............... 441/65 |
| 7,871,652 B2 | * | 1/2011 | Woodhouse et al. | ......... 426/104 |
| 8,097,479 B2 | * | 1/2012 | Masuda et al. | ............... 438/29 |

FOREIGN PATENT DOCUMENTS

| | | |
|---|---|---|
| JP | 5-131243 | 5/1993 |
| JP | 6-226869 | 8/1994 |
| JP | 7-195341 | 8/1995 |
| JP | 8-057967 | 3/1996 |
| JP | 8-281808 | 10/1996 |
| JP | 9-024552 | 1/1997 |
| JP | 9-216200 | 8/1997 |
| JP | 9-314280 | 12/1997 |
| JP | 10-328781 | 12/1998 |
| JP | 2002-542079 | 12/2002 |
| JP | 2006-192710 | 7/2006 |
| JP | 2010-515606 | 5/2010 |
| WO | WO00/64608 A1 | 11/2000 |
| WO | WO2008/088761 A1 | 7/2008 |

* cited by examiner

*Primary Examiner* — Lan Vinh
(74) *Attorney, Agent, or Firm* — Cooper & Dunham LLP

(57) ABSTRACT

A three-dimensional object fabrication method and apparatus to fabricate a three-dimensional object from a foamed material are provided. The method includes applying a solvent to dissolve the foamed material; dissolving and contracting the foamed material; and molding a three-dimensional object. The solvent is applied to a surface of the foamed material, thereby dissolving and contracting of the foamed material in a depth direction, or otherwise, the solvent is applied to an interior portion of the foamed material, thereby releasing air contained inside the foamed material and starting contraction of the foamed material itself. The method further includes adjusting an amount of the solvent depending on a thickness of the three-dimensional object, filling in a recess or a concavity formed in the foamed material with a molding material; solidifying the molding material as a mold; and transferring a shape of the recess or the concavity to the molding material.

6 Claims, 16 Drawing Sheets

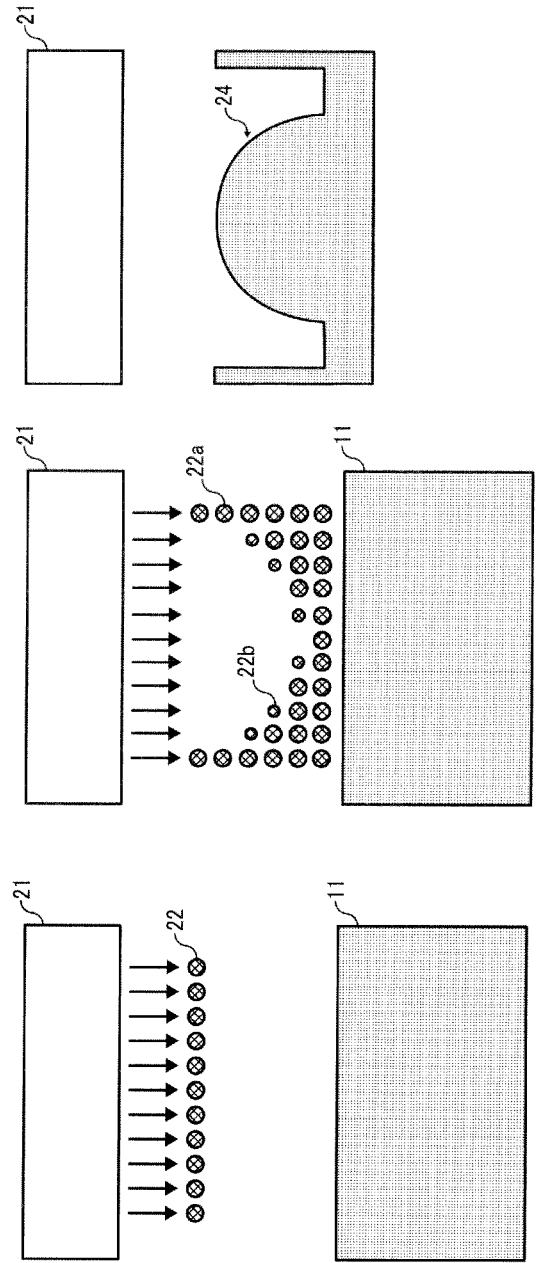

METHOD AND APPARATUS FOR FABRICATING THREE-DIMENSIONAL OBJECT

CROSS-REFERENCE TO RELATED APPLICATION

The present application claims priority pursuant to 35 U.S.C. §119(a) from Japanese patent application number 2013-102361, filed on May 14, 2013, the entire disclosure of which is incorporated by reference herein.

BACKGROUND

1. Technical Field

The present invention relates to a method and apparatus for fabricating a three-dimensional object.

2. Related Art

Rapid Prototyping (RP) is a three-dimensional object fabrication method that fabricates a three-dimensional object by cutting and shaving a material. Liquid is jetted with high pressure onto a foamed material such as polystyrene foam by a liquid jetting means moved in X-, Y-, and Z-directions while cutting and shaving the material, to thus fabricate a three-dimensional object. Specifically, using the XYZ direction movable unit, the liquid jetting means is moved responsive to the shape of the three-dimensional object. The liquid jetting means jets aqueous flow to the object while adjusting the pressure of the high pressure aqueous flow, thereby adjusting cutting amount of the object and fabricating the three-dimensional object with a predetermined shape.

However, in the above fabrication method, particles are produced by the cutting process that adhere to the surface of the processed object and remain there, becoming an abrasive compound that grinds the surface of the processed object more than necessary, and thus, a predetermined shape is not obtained. Moreover, the produced particles flow into air in the work area and can be hazardous to human health when inhaled. As a result, a collection mechanism to collect the cut particles is required. Yet provision of the collection device may enlarge the whole apparatus.

SUMMARY

In one embodiment of this disclosure, there is a three-dimensional object fabrication method and apparatus to mold a three-dimensional object from a foamed material. The method includes applying a solvent to dissolve the foamed material; dissolving and contracting the foamed material; and molding a three-dimensional object. The method includes applying the solvent to an interior portion of the foamed material, thereby releasing air contained inside the foamed material, and starting contraction of the foamed material itself. The method further includes adjusting an amount of the solvent depending on a thickness of the three-dimensional object; filling in a recess or a concavity formed in the foamed material with a molding material; solidifying the molding material as a mold; and transferring a shape of the recess or the concavity to the molding material. The apparatus implements the method as described above.

These and other objects, features, and advantages of the present invention will become apparent upon consideration of the following description of the preferred embodiments of the present invention when taken in conjunction with the accompanying drawings.

BRIEF DESCRIPTION OF THE DRAWINGS

FIGS. 6A to 6C are cross-sectional views illustrating a three-dimensional object fabricating apparatus according to a first example of a second embodiment of the present invention;

DETAILED DESCRIPTION

Hereinafter, a first embodiment in which the present invention is applied to a three-dimensional object fabricating apparatus is described referring to the accompanying drawings.

Figure 1A:
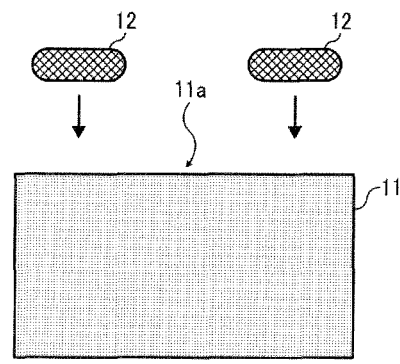
FIGS. 1A to 1C are cross-sectional views illustrating a three-dimensional object fabricating process according to a first embodiment of the present invention.
Figure 1B:
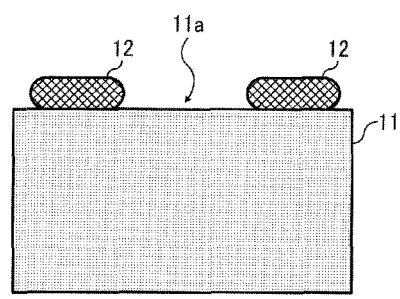
Figure 1C:
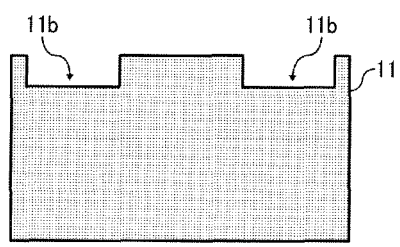
Figure 2:
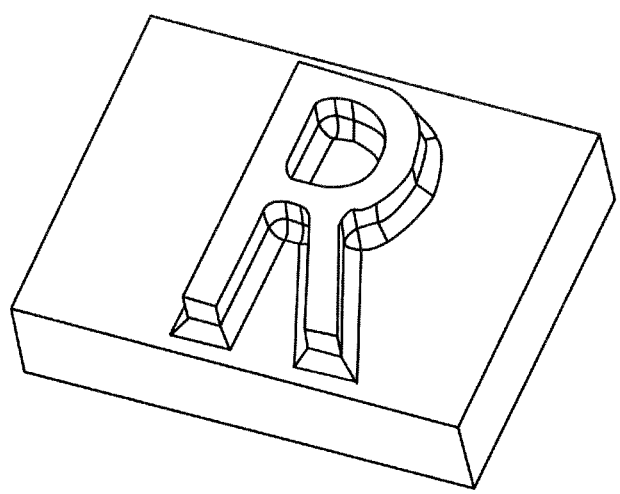
FIG. 2 is a perspective view illustrating an example of the three-dimensional object.

FIGS. 1A to 1C are cross-sectional views illustrating the three-dimensional object fabricating process according to the first embodiment. As illustrated in FIG. 1A, a foamed material 11 is used to create a three-dimensional object, and a solvent 12 is adhered on a surface 11a of the foamed material 11. As illustrated in FIGS. 1B and 1C, a portion of the foamed material 11, on which the solvent 12 is adhered, is dissolved, and air included inside the foamed material is released, thereby causing the foamed material 11 itself to contract. The solvent 12 expands along concave portions 11b formed by the contraction and further causes the foamed material 11 to contract. At the same time, the solvent 12 becomes reduced due to vaporization and when the solvent 12 evaporates completely, the contraction of the foamed material 11 stops. As a result, as illustrated in FIG. 2, a three-dimensional letter R is formed such that the solvent 12 is adhered to the foamed material other than the letter R, the portion other than the letter is recessed, and the letter portion appears in raised relief. The formed letter can be used as a seal or a three-dimensional doorplate. Preferred material for the solvent is, when polystyrene is used for the foamed material, d-limonene with low toxicity.

Figure 3A:
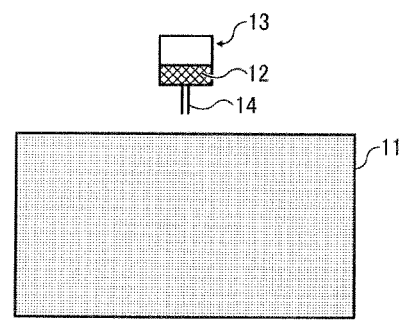
FIGS. 3A to 3C are cross-sectional views illustrating a first modified example of the three-dimensional object fabricating process according to the first embodiment.
Figure 3B:
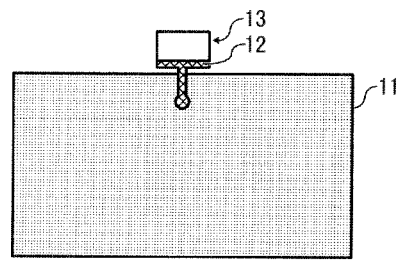
Figure 3C:
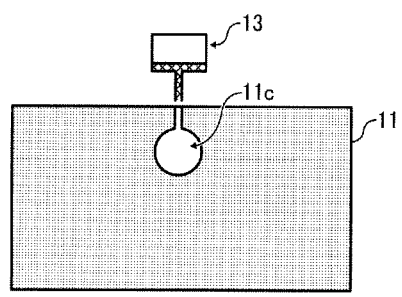

FIGS. 3A to 3C are cross-sectional views illustrating a first modified example of the three-dimensional object fabricating process according to the first embodiment. As illustrated in the figures, a needle pipe 14 of a solvent injector 13 is inserted into the foamed material 11 to a predetermined position inside the foamed material 11 (see FIGS. 3A, 3B). Then, the solvent 12 to dissolve the foamed material 11 is injected from a tip of the needle pipe 14. The solvent 12 adheres to and dissolves an interior portion of the foamed material 11, thereby releasing the air contained inside the foamed material 11, and the material of the foamed material 11 itself starts to contract. As illustrated in FIG. 3C, the solvent 12 expands along the recess 11e formed by the contraction and further contracts the foamed material 11. At the same time, the solvent 12 is itself reduced due to its vaporization. When the solvent 12 evaporates completely, contraction of the foamed material 11 stops. In such a way, a hollow three-dimensional object having a hollow cavity can be created.

Figure 4A:
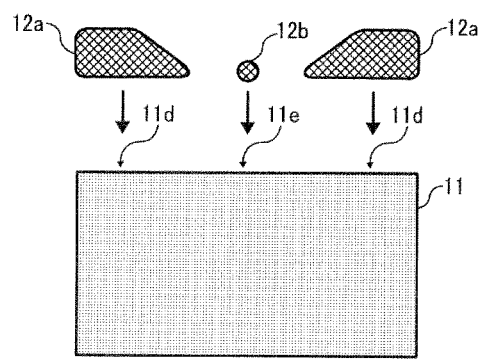
FIGS. 4A to 4C are cross-sectional views illustrating a second modified example of the three-dimensional object fabricating process according to the first embodiment.
Figure 4B:
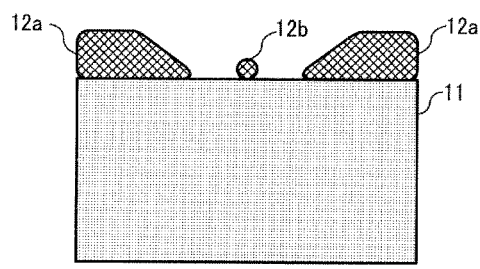
Figure 4C:
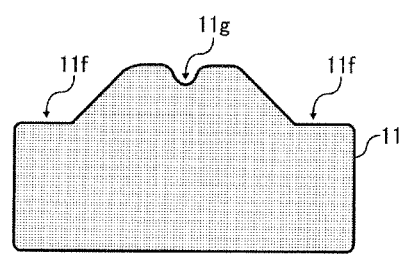

FIGS. 4A to 4C are cross-sectional views illustrating a second modified example of the three-dimensional object fabricating process according to the first embodiment. The second modified example shows how to create a topographical map or a terrain model. As illustrated in FIGS. 4A and 4B, a greater amount of solvent 12a is adhered on a surface 11d being a portion which should be contracted greatly in a direction of the thickness of the foamed material 11. By contrast, a small amount of solvent 12b is adhered on a surface 11e being a portion which contracts a little in the direction of the thickness of the foamed material 11. Further, as illustrated in FIG. 4C, air contained inside the foamed material 11 is released corresponding to each amount of the solvent 12a, 12b adhered on the surfaces 11d, 11e of the foamed material 11 and the foamed material 11 contracts, so that the depths in the direction of the thickness of the foamed material 11 are varied. Specifically, each recess 11f has a depth larger than that of a recess 11g. If the amount of the solvent is varied in multiple steps or continuously, a smooth sloping surface may be formed as illustrated in FIG. 4C.

Figure 5A:
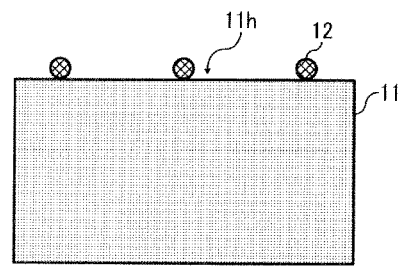
FIGS. 5A to 5D are cross-sectional views illustrating a third modified example of the three-dimensional object fabricating process according to the first embodiment.
Figure 5B:
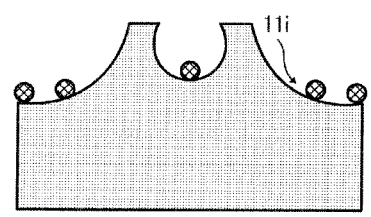
Figure 5C:
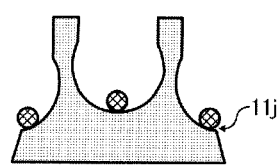
Figure 5D:
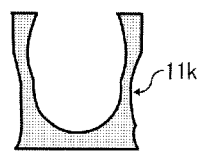

FIGS. 5A to 5D are cross-sectional views illustrating a third modified example of the three-dimensional object fabricating process according to the first embodiment. As illustrated in FIG. 5A, the solvent 12 to dissolve the foamed material 11, from which a three-dimensional object is fabricated, is adhered on a surface 11h of the foamed material 11. Air contained inside the foamed material 11 is released by the solvent 12, so that the material itself forming the foamed material starts to contract. As illustrated in FIG. 5B, because the solvent 12 causes the foamed material 11 to contract in every direction excluding the weight direction from the adhered portion thereof, a recess end 11i formed when the contraction stops includes a partially undercut shape. As illustrated in FIG. 5C, as contraction progresses, and before the recess end 11i includes a partially undercut shape, the solvent 12 is further adhered to another recess end 11j in the vicinity of the recess end 11i. With this operation, the undercut amount of the recessed portion when the contraction stops becomes greater than ever, so that a still greater recess 11k can be formed.

FIGS. 6A to 6C are cross-sectional views illustrating a three-dimensional object fabricating apparatus according to a first example of a second embodiment of the present invention. The three-dimensional object fabricating apparatus according to the present embodiment includes a droplet discharging head 21 having a nozzle (not shown). As illustrated in FIG. 6B, large or small droplets 22a, 22b are discharged from the nozzle of the droplet discharging head 21 and the discharged droplet adheres on a surface of the foamed material 11. As illustrated in FIG. 6C, air contained inside the foamed material 11 is released therefrom corresponding to an amount of the solvent based on the three-dimensional data, from an upstream device (not shown), related to the predetermined shape of the three-dimensional object. By varying the resolution and the amount of the solvent discharged from the droplet discharging head 21, a shape similar to the predetermined shape of the object can be obtained.

Figure 7A:
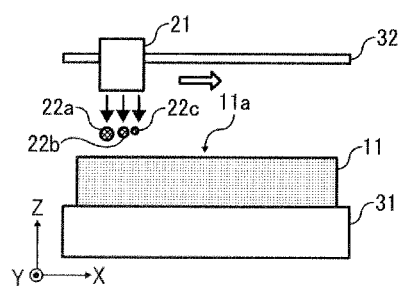
FIGS. 7A to 7H are cross-sectional views illustrating a three-dimensional object fabricating apparatus according to a second example of the second embodiment.
Figure 7B:
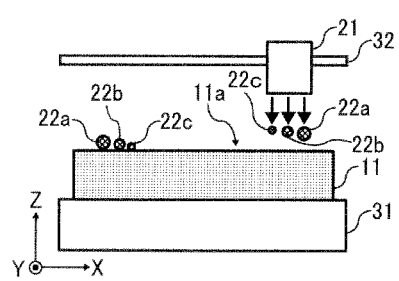
Figure 7C:
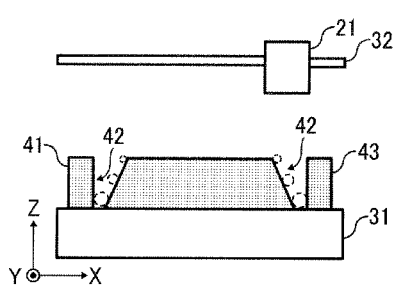
Figure 7D:
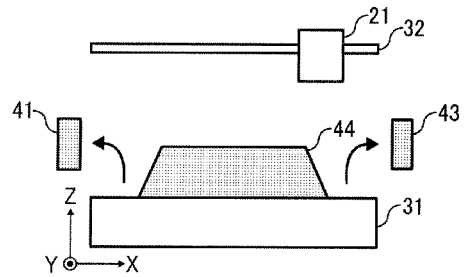
Figure 7E:
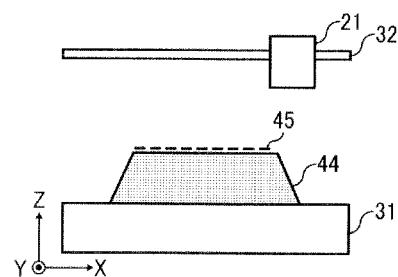

FIGS. 7A to 7H are cross-sectional views illustrating a three-dimensional object fabricating apparatus according to a second example of the second embodiment of the present invention. A thickness of the foamed material 11 to fabricate a three-dimensional object is set to below a predetermined thickness to prevent resolution of molding from decreasing due to a skin layer or a boundary film that is generated when the dissolving contraction of the foamed material increases. Then, as illustrated in FIGS. 7A and 7B, the three-dimensional object fabricating apparatus according to the present embodiment includes a droplet discharging head 21. The droplet discharging head 21 is moved in the X-scanning direction and the Y-scanning direction perpendicular to the X-scanning direction by a scanning device 32. The droplet discharging head 21 moved by the scanning device 32 discharges, from its nozzle, solvent droplets 22a, 22b, 22c corresponding to a liquid amount based on the three-dimensional information on the shape of the three-dimensional object from an upstream device, not shown, toward the foamed material 11 placed on a pedestal 31 that can move in the vertical direction, so that the solvent droplets are adhered on the surface 11a of the foamed material 11. Based on the three-dimensional information on the shape of the three-dimensional object, the pedestal 31 is caused to be moved vertically, or scanned planarly in the X-Y direction. Alternatively, the droplet discharging head 21 is scanned in the X-Y direction. With this configuration, the foamed material 11 on the pedestal 31 and the droplet discharging head 21 are scanned relatively. As a result, the solvent 12 is applied to the foamed material 11 from the X-, Y-, and Z-axis directions corresponding to the three-dimensional shape of the object. As illustrated in FIGS. 7C and 7D, when the solvent 12 is adhered to the foamed material 11, air contained inside the foamed material 11 is released by the solvent 12 so that the foamed material 11 itself starts to contract up to a predetermined position in the depth direction. A boundary 42 adjacent to waste 41 which is unnecessary with respect to the predetermined shape is formed by dissolving the foamed material 11 completely in the width direction and by contracting it. Then, waste 43 is removed next, and as illustrated in FIG. 7E, an adhesive 45 is applied to a three-dimensional object 44, a requisite part to form the predetermined shape among the sheet-shaped materials. Thus, formation of the sheet portion is completed.

Figure 7F:
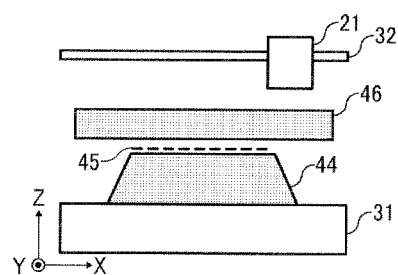
Figure 7G:
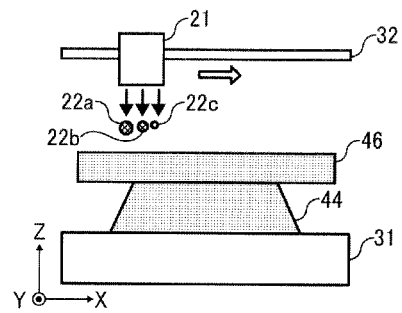
Figure 7H:
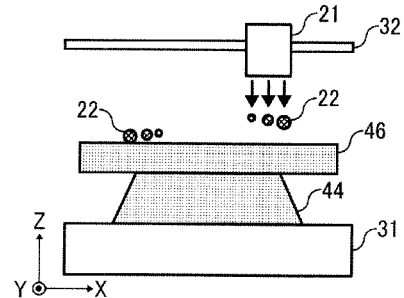

As illustrated in FIG. 7F, the pedestal 31 is lowered by a thickness of one sheet. Then, a next foamed material 46 (second sheet) is supplied on the foamed material 11 and pressure is applied. Thus, the foamed material 11 and the foamed material 46 are laminated. As illustrated in FIGS. 7G and 7H, the same process is performed to the second sheet and successive sheets repeatedly, thereby forming a laminated three-dimensional object. In the present invention, it is impossible to contract the foamed material 11 below the foam formation rate. A skin layer or a boundary film generated by the dissolving and contraction due to the solvent on the surface of the foamed material 11 reduces the precision of molding or resolution. In addition, it is difficult to process by precision of molding below the diameter of foam of the foamed resin. In particular, with bead method expandable polystyrene (EPS), the precision of molding decreases due to a grain boundary of the bead before generation of the foam. To mold a high-precision three-dimensional object, the foamed material is preferably formed by extrusion molding (XPS or PSP), by which a fine uniform foam can be obtained. Further, when the liquid droplet discharge head discharges the solvent, the diameter of the foam is preferably less than one half of the nozzle pitch, i.e., the resolution. In addition, an adhesive without an organic solvent should be used.

Figure 8A:
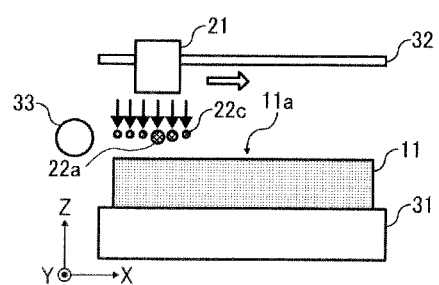
FIGS. 8A to 8G are cross-sectional views illustrating a three-dimensional object fabricating apparatus according to a third example of the second embodiment.
Figure 8B:
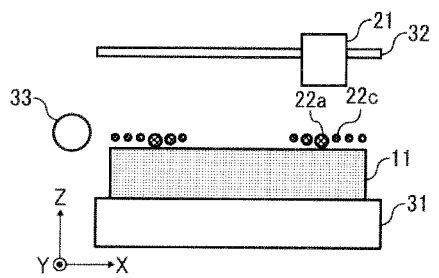
Figure 8C:
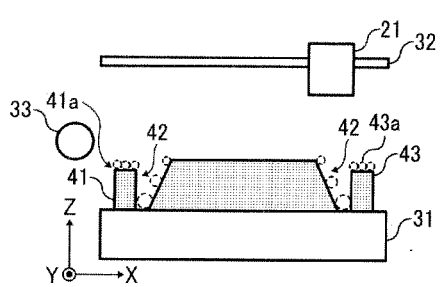
Figure 8D:
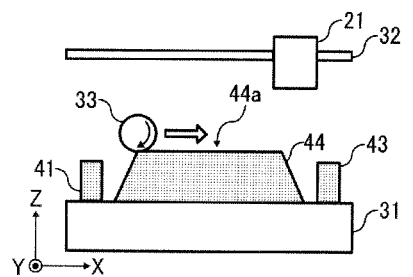
Figure 8E:
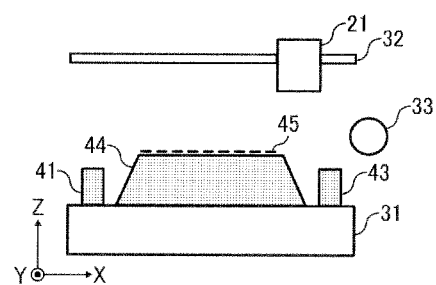
Figure 8F:
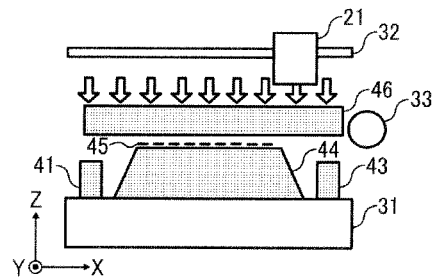
Figure 8G:
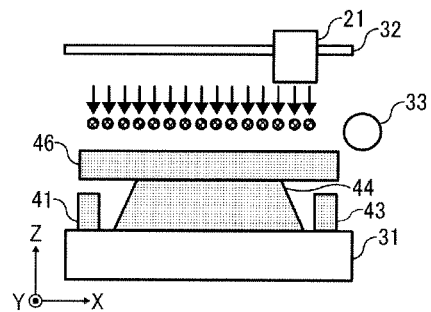

FIGS. 8A to 8G are cross-sectional views illustrating a three-dimensional object forming process according to a third example of the second embodiment. As illustrated in FIGS. 8A and 8B, the three-dimensional object fabricating apparatus according to the present example is placed on the pedestal 31 which can move up and down, and causes the droplet discharging head 21 to discharge, from its nozzle (not shown), large and small solvent droplets 22a, 22c of the amount corresponding to a shape of the three-dimensional object onto the sheet-like foamed material 11 that forms the three-dimensional object, and to adhere the droplets on the surface of the foamed material 11. When the solvent 12 is adhered to the foamed material 11, air contained in the foamed material 11 is released by the solvent 12 so that the foamed material 11 itself starts to contract up to a predetermined position in the depth direction. As illustrated in FIG. 8C, the boundary 42 with the waste 41 is formed by dissolving and contracting the foamed material 11 in its while depth, to thus separate the boundary 42 from the waste 41. At the same time, an upper surface 41a of the waste 41 is dissolved and contracted, so that a surface 44a alone that needs to be laminated with a sheet-like foamed material 46 is made as the same plane. The foamed material 46 is a sheet necessary to create a predetermined shape. The adhesive 45 is coated on the surface 44a with a roller 33 as illustrated in FIG. 8D. In this case, because the upper surfaces 41a, 43a of the wastes 41, 43 are dissolved and contracted, the roller 33 does not contact thereto and the adhesive is not adhered to the surfaces 41a, 43a. Thus, formation of the sheet portion is completed. Next, as illustrated in FIGS. 8F and 8G, the pedestal 31 is lowered by the thickness of a sheet and a second sheet of a next foamed material 46 is placed on the pedestal 31. Then, pressure is applied to the foamed material 46 from above, so that the foamed material 11 and the foamed material 46 are laminated in layers. In this case, although the wastes 41, 43 remain on the pedestal 31, because the upper surfaces are dissolved and contracted entirely, the foamed material 46 does not contact the surfaces 41a, 43a. Accordingly, even though the adhesive erroneously is attached to the upper surfaces of the wastes 41, 43, contact with the foamed material 46 is prevented. As a result, the wastes 41, 43 can be removed easily in post-processing. The same process is performed with a third and successive sheets, and a layered three-dimensional object can be formed. Thus, removal of the wastes 41, 43 can be done after all processes are completed, thereby simplifying the process. Further, there no need of removing the wastes 41, 43 in the work environment in which the solvent is evaporated, thereby improving the work environment.

Figure 9A:
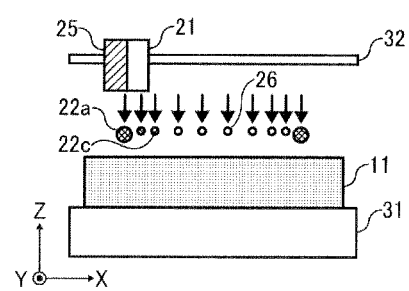
FIGS. 9A to 9G are cross-sectional views illustrating a three-dimensional object fabricating apparatus according to a fourth example of the second embodiment.
Figure 9B:
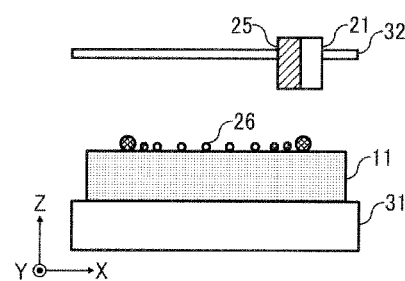
Figure 9C:
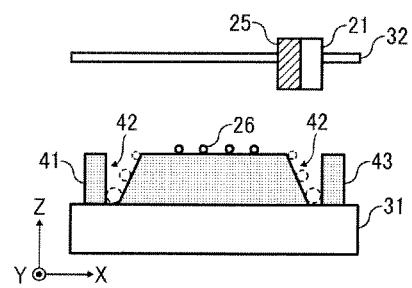
Figure 9D:
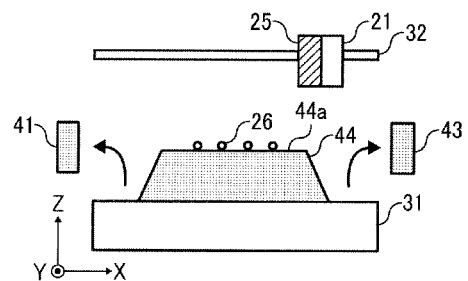
Figure 9E:
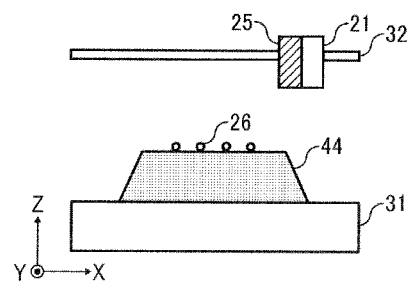
Figure 9F:
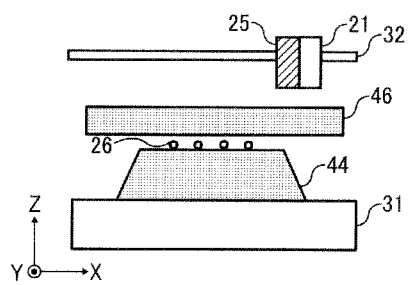
Figure 9G:
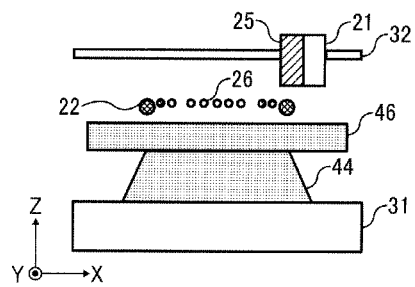

FIGS. 9A to 9G are cross-sectional views illustrating a three-dimensional object forming process according to a fourth example of the second embodiment. As illustrated in FIGS. 9A and 9B, the three-dimensional object fabricating apparatus according to the present example is placed on the pedestal 31 which moves up and down, and causes the droplet discharging head 21 to discharge, from its nozzle (not shown), large and small solvent droplets 22a, 22c of the amount corresponding to a shape of the three-dimensional object onto the sheet-like foamed material 11 that forms the three-dimensional object, and to adhere the droplets on the surface of the foamed material 11. When the solvent 12 is adhered to the foamed material 11, air contained inside the foamed material 11 is released by the solvent 12 so that the foamed material 11 itself starts to contract up to a predetermined position in the depth direction. As illustrated in FIGS. 9C, 9D, and 9E, the boundary 42 with the waste 41 is formed by dissolving and contracting an entire thickness of the foamed material 11 to thus separate the boundary 42 from the waste 41. At the same time, to form a predetermined shape from the molded sheet-like foamed material, several droplets of an adhesive 26 to adhere both materials each other are discharged onto the surface 44a of the three-dimensional object 44 from a nozzle (not shown) of a droplet discharging head 25 until one sheet of molding is complete. Next, as illustrated in FIGS. 9F and 9G, the waste 41 is removed, the pedestal 31 is lowered by the thickness of a sheet, and a second sheet of a next foamed material 46 is placed on the foamed material 11 and pressure is applied from above to the foamed material 46, so that the foamed material 11 and the foamed material 46 are laminated in layers. The same process is performed with a third sheet and successive sheets, and a layered three-dimensional object can be formed. Thus, without providing a separate adhesive coating process as illustrated in FIGS. 7 and 8, an adhesive coating process can be performed simultaneously when the droplet discharging head 21 moves to fabricate the three-dimensional object, thereby simplifying the process.

In the three-dimensional object fabrication method according to the first embodiment and the three-dimensional object fabricating apparatus according to the second embodiment, the foamed material 11 itself is used as a material for forming the three-dimensional object. In the three-dimensional object fabrication method according to the third embodiment, the foamed material 11 is used as a mold to fabricate a three-dimensional object.

Figure 10A:
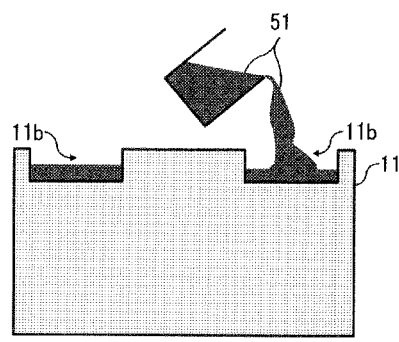
FIGS. 10A and 10B are cross-sectional views illustrating a final process of the three-dimensional object fabricating process according to a first example of the third embodiment.
Figure 10B:
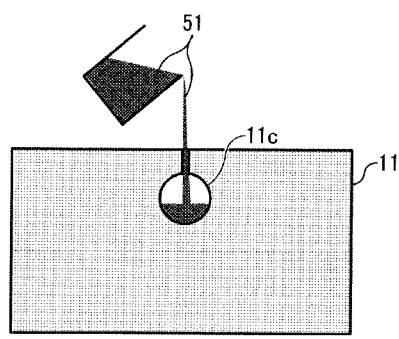

FIGS. 10A and 10B are cross-sectional views illustrating a final process of the three-dimensional object forming process according to a first example of the third embodiment. In the process as illustrated in FIG. 10A, the foamed material 11 created through the processes as illustrated in FIGS. 1A, 1B, and 1C is used as a mold. In the process as illustrated in FIG. 10B, the foamed material 11 created through the processes as illustrated in FIGS. 3A, 3B, and 3C is used as a mold. As illustrated in FIGS. 10A and 10B, an aqueous molding material 51 fills in the concave portions 11b, 11c that are formed by the contraction of the foamed material 11. In the case of FIG. 10A, the solidified molding material 51 is taken out from the foamed material 11 serving as a mold, to thus obtain a three-dimensional object. In the case of FIG. 10B, the foamed material 11 as a mold is partially broken or cut to take out the solidified molding material 51, to thus obtain a three-dimensional object. Alternatively, the molding material 51 can be taken out by dissolving the foamed material 11.

Figure 11A:
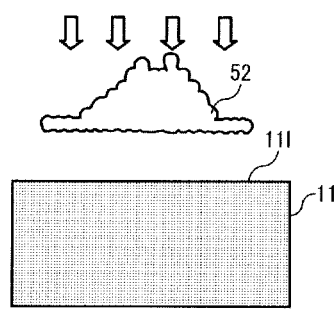
FIGS. 11A to 11D are cross-sectional views illustrating the three-dimensional object fabricating process according to a second example of the third embodiment.
Figure 11B:
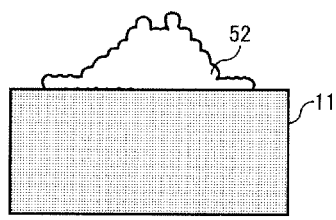
Figure 11C:
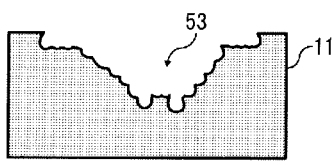
Figure 11D:
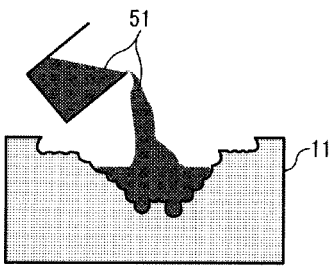

FIGS. 11A to 11D are cross-sectional views illustrating the three-dimensional object forming process according to a second example of the third embodiment. As illustrated in FIGS. 11A and 11B, a solvent 52 to dissolve the foamed material 11 serving as a mold to fabricate a three-dimensional object is adhered to a surface 11 of the foamed material 11. When the solvent 52 is adhered to the foamed material 11, air contained inside the foamed material 11 is released by the solvent 52, so that the material itself of the foamed material 11 starts to contract. As illustrated in FIG. 11C, the solvent 52 expands along a concave portion 53 formed by contraction and further contracts the foamed material 11. At the same time, the solvent 52 is itself reduced due to its vaporization. When the solvent 52 is evaporated completely, contraction of the foamed material 11 stops. As illustrated in FIG. 1 ID, the liquid molding material 51 is filled in the concave portion 53 formed by the contraction of the foamed material 11. The solidified molding material 51 is taken out from the foamed material 11 serving as a mold and is used as a three-dimensional object.

Figure 12A:
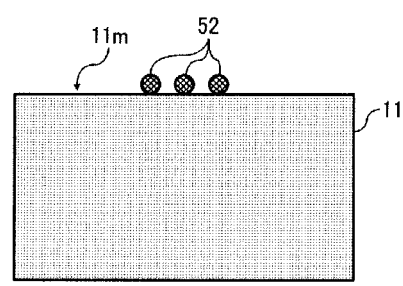
FIGS. 12A to 12D are cross-sectional views illustrating the three-dimensional object fabricating process according to a third example of the third embodiment.
Figure 12B:
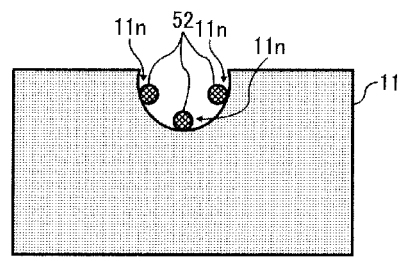
Figure 12C:
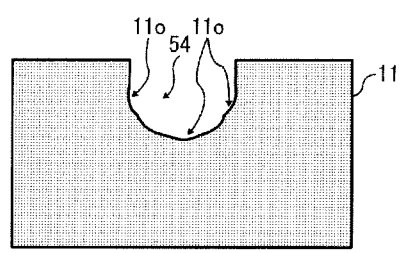
Figure 12D:
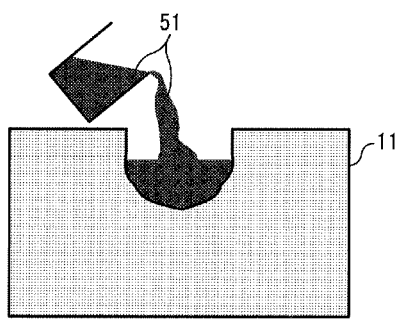

FIGS. 12A to 12D are cross-sectional views illustrating the three-dimensional object forming process according to the third example of the third embodiment. As illustrated in FIGS. 12A and 12B, a solvent 52 to dissolve the foamed material 11 serving as a mold to fabricate a three-dimensional object is adhered to a surface 11m of the foamed material 11. When the solvent 52 is adhered to the foamed material 11, air contained inside the foamed material 11 is released by the solvent 52, so that the material itself of the foamed material 11 starts to contract. As illustrated in FIG. 12C, because the solvent 52 causes the foamed material 11 to contract in every direction excluding the weight direction from the adhered portion thereof, a recess end 11n formed when the contraction stops includes a partially undercut shape. As contraction progresses, and before the recess end 11n includes a partially undercut shape, the solvent 52 is further adhered to another recess end 11n. Thus, when the contraction stops, each recess end 11n includes a predetermined undercut amount formed by contraction. Further, portions 11o are formed respectively. As illustrated in FIG. 12D, a liquid molding material 51 fills in the concave portion 54 and the recess portions 11o formed by the contraction of the foamed material 11. The solidified molding material 51 is taken out of the foamed material 11 serving as a mold and is used as a three-dimensional object.

Figure 13:
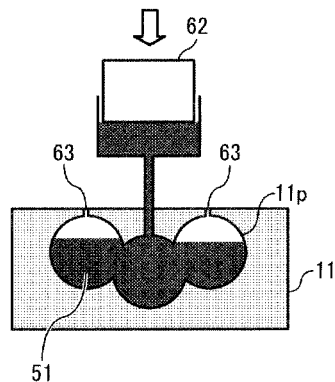
FIG. 13 is a cross-sectional view illustrating a three-dimensional object fabricating process according to a fourth example of the third embodiment.

FIG. 13 is a cross-sectional view illustrating a three-dimensional object fabricating process according to a fourth example of the third embodiment.

Figure 14A:
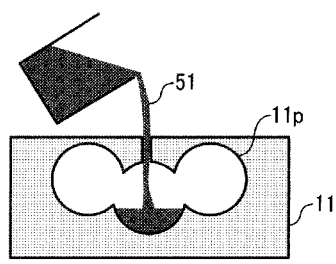
FIGS. 14A and 14B are views without using a transfer unit in the fourth example as depicted in FIG. 13.
Figure 14B:
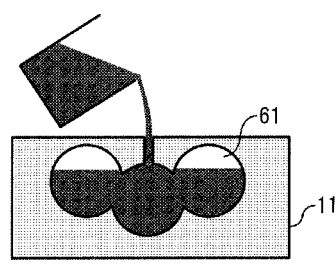

When a mold of the foamed material 11 is fabricated through the processes as depicted in FIGS. 3A to 3C, the solvent is injected multiple times from different portions and a mold including a concave portion 11p with a complicated shape as illustrated in FIG. 14A can be fabricated. In fabricating such a complicated shape, however, completely filling in the concave portion 11p with the liquid molding material 51 is not easily done due to the presence of air pockets 61 as illustrated in FIG. 14B. As a result, the shape of the mold of the concave portion 11p cannot be accurately transferred to the solidified molding material 51.

In order to transfer the concave portion 11p accurately, use of a transfer unit as illustrated in FIG. 13 is effective when filling in the liquid molding material 51. The transfer unit is constructed of a pressure unit 62 to press the liquid molding material 51 and the concave portion 11p including air outlets 63 in the top of the concave portion 11p. When the transfer unit is configured to inject the liquid molding material 51 under pressure, air remaining in the concave portion having a complicated shape is pushed out through the air outlets 63 and the liquid molding material 51 fills in the concave portion 11p completely, so that the mold can be accurately transferred.

Figure 15:
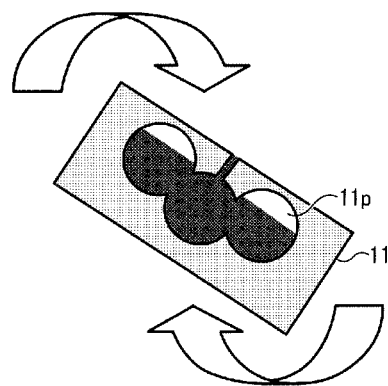
FIG. 15 is a cross-sectional view illustrating a three-dimensional object fabricating process according to a fifth example of the third embodiment.

FIG. 15 is a cross-sectional view illustrating a three-dimensional object fabricating process according to a fifth example of the third embodiment.

As illustrated in FIG. 15 the transfer unit includes a rotation means to vertically rotate the mold formed of the foamed material 11. The foamed material 11 is caused to continue to rotate slowly until the liquid molding material 51 solidifies, so that the liquid molding material 51 adheres to the concave portion 11d and solidifies from four corners evenly, so that the shape of the mold can be transferred accurately.

When such a type of transfer unit is used, because the molding material solidifies from peripheral portions thereof, the final solid mold may have a hollow interior. However, during solidification, additional liquid molding material 51 can be injected to fill the hollow portion.

The present invention is not limited to the examples as described above and various other processes can be used to improve transferability of the molding material 51 to the mold. For example, instead of the pressure unit, injection-filling method or decompression-filling method may be used. Further, the rotation means may be replaced with an oscillation means.

When the solvent to dissolve the foamed material of the object is applied to the foamed material, the foamed material contracts while being melted at a portion to which the solvent is applied, thereby finely adjusting a shape of the foamed material. During formation of the three-dimensional object, no waste particle is produced. As a result, no collection mechanism is needed, so that a compact apparatus without a collection mechanism is created.

Additional modifications and variations of the present invention are possible in light of the above teachings. It is therefore to be understood that, within the scope of the appended claims, the invention may be practiced other than as specifically described herein.

What is claimed is:

1. A three-dimensional object fabrication method to fabricate a three-dimensional object from a foamed material, comprising:
   applying a solvent to dissolve the foamed material, the solvent being applied selectively based on data related to a shape of the three-dimensional object to be molded;
   partially dissolving and contracting the foamed material; and
   molding a three-dimensional object from the foamed material.

2. The three-dimensional object fabrication method as claimed in claim 1, wherein the solvent is applied to a surface of the foamed material and the dissolving and contracting of the foamed material is directed in a depth direction of the foamed material.

3. The three-dimensional object fabrication method as claimed in claim 1, wherein the solvent is applied to an interior portion of the foamed material, thereby releasing air contained inside the foamed material and starting contraction of the foamed material itself.

4. The three-dimensional object fabrication method as claimed in claim 1, further comprising adjusting an amount of the solvent depending on a thickness of the three-dimensional object.

5. The three-dimensional object fabrication method as claimed in claim 1, comprising applying the solvent to the foamed material while the foamed material is contracting.

6. The three-dimensional object fabrication method as claimed in claim 1, comprising:
   filling in a concavity or space formed in the foamed material with a molding material;
   solidifying the molding material as a mold; and
   transferring a shape of the concavity or space to the molding material.

* * * * *